United States Patent [19]

Tuutijarvi et al.

[11] Patent Number: 5,774,809
[45] Date of Patent: Jun. 30, 1998

[54] SIMPLIFIED MOBILE ASSISTED HANDOFF OF SIGNAL BETWEEN CELLS

[75] Inventors: Mika Jari Pietari Tuutijarvi; Raimo Tapio Klemetti, both of Oulu; Jorma Antero Savolainen, Timola; Eero Sakari Makikallio, Oulu, all of Finland

[73] Assignee: Nokia Mobile Phones LImited, Salo, Finland

[21] Appl. No.: 599,718

[22] Filed: Feb. 12, 1996

[51] Int. Cl.⁶ .................................................. H04Q 7/20
[52] U.S. Cl. ........................ 455/437; 455/436; 455/439
[58] Field of Search .................................... 455/422, 425, 455/432, 436, 437, 438, 439, 442, 444

[56] References Cited

U.S. PATENT DOCUMENTS

| | | | |
|---|---|---|---|
| 4,718,081 | 1/1988 | Brenig | 455/438 |
| 5,117,502 | 5/1992 | Onoda et al. | 455/437 |
| 5,203,010 | 4/1993 | Felix et al. | 455/437 |
| 5,267,261 | 11/1993 | Blakeney, II et al. | 455/437 |
| 5,293,643 | 3/1994 | Israelsson | 455/437 |
| 5,323,446 | 6/1994 | Kojima et al. | 455/437 |
| 5,327,575 | 7/1994 | Menich et al. | 455/437 |
| 5,345,448 | 9/1994 | Keskitalo | 370/95.3 |
| 5,410,733 | 4/1995 | Niva et al. | 455/436 |
| 5,428,816 | 6/1995 | Barnett et al. | 455/436 |
| 5,432,843 | 7/1995 | Bonta | 455/437 |
| 5,483,669 | 1/1996 | Barnett et al. | 455/436 |
| 5,491,837 | 2/1996 | Haartsen | 455/437 |
| 5,499,386 | 3/1996 | Karlsson et al. | 455/437 |
| 5,499,387 | 3/1996 | Chambert | 455/436 |
| 5,517,675 | 5/1996 | O'Connor et al. | 455/437 |
| 5,542,097 | 7/1996 | Ward et al. | 455/437 |
| 5,634,192 | 5/1997 | Meche et al. | 455/437 |

FOREIGN PATENT DOCUMENTS 0 488 015 A2   3/1991   European Pat. Off. .

*Primary Examiner*—Dwayne D. Bost
*Assistant Examiner*—Nay Maung
*Attorney, Agent, or Firm*—Perman & Green, LLP

[57] ABSTRACT

In the method of this invention, a mobile station is constructed to receive predetermined signals from neighboring base stations as an indication of received signal strength. These signals are compared to the current traffic signal strength indicator and a resultant signal is calculated proportional to the differential signal strength. Only the current received signal strength indicator is transmitted to the base station in absolute value. All other indicators are reported as relative values.

14 Claims, 3 Drawing Sheets

5,774,809

SIMPLIFIED MOBILE ASSISTED HANDOFF OF SIGNAL BETWEEN CELLS

BACKGROUND OF THE INVENTION

One of the most critical functions between a mobile station and its associated cellular system is the transfer of calls from one base station to another as the user travels from one cell to an adjoining cell. The system of this invention facilitates this transfer without the need to enhance the performance of the various signal processing elements of the system. An increased accuracy of the initiating signals is also accomplished.

A typical cellular system consists of a mobile station, base station, and a switch center. The mobile station can be the well known cellular phone which transmits a signal to access the cellular system when the user desires to originate or receive a call.

The base station is representative of a particular area or zone of the system generally referred to as a cell. Each base station is in communication with a mobile switching center which switches calls from base station to base station and connects the base station with the local phone system typically over land lines.

As the mobile station moves through a cell the strength of its transmitted signal will vary depending on its distance from the base station. The base station's range of operation is designed to drop off rapidly as the limits of its cell is surpassed. If a cell is left during a communication, it is necessary that a new base station be selected without any disturbance to the transmission. In early systems, the base station monitored the strength of the signal emanating from the mobile station. As signal strength lowered to critical levels, a search was conducted by neighboring base stations to determine which base station was receiving the strongest signal from the moving mobile station. The switching center would then instruct the mobile station through the base station to change to the necessary parameters of the new base station.

More recently, the mobile station is designed to measure the strength of certain signals transmitted by surrounding base stations and transmit this information back through the base station to the switching center. This gives the switching center the information necessary to decide when and to what base station a particular mobile station must be switched in order to maintain communication. This is called a mobile assisted handoff and a system of this type is described in E.P.O. publication no. 0 448 015 A2.

Although the mobile assisted handoff simplifies the signal receiving and processing tasks of the base station, it creates other problems of inaccuracies in signal processing by the mobile station.

The systems of the prior art rely on an evaluation of absolute value signals to determine the selection of hand off candidates. This requires accuracy which is demanding for the automatic gain control of the mobile station and may require operation beyond its linear range. To improve the accuracy several fine tuning steps need to be performed during the manufacturing process and such steps are time consuming and expensive. A separate problem which effects accuracy is the radio frequency amplification that operates between a high and low level depending on the signal and can cause disparities between the compared signals if one is at high amplification and the other is at low amplification.

The system of this invention reduces the effects of each of these limitations by generating base station evaluation signals that are of relative as opposed to absolute values. This allows the signal processing to be accomplished with more accuracy. The amplification levels can be set at lower levels minimizing the evaluation of inconsistent signals and aiding in maintaining amplifier operation in the linear range. Overall the handoff evaluation process is accomplished in a more narrow operating range which results in many advantages.

It is the purpose of this invention to accommodate the limitations of the mobile station signal processing and provide accuracy in the crucial range of the received signal strength indicator, namely in the highest signal level channels relative to the current traffic channel.

SUMMARY OF THE INVENTION

In the method of this invention, a mobile station is constructed to receive predetermined signals from neighboring base stations as an indication of received signal strength. These signals are compared to the current traffic channel signal strength indicator and a resultant signal is calculated proportional to the differential signal strength. Only the current received signal strength indicator is transmitted to the base station in absolute value. All other indicators are reported as relative values.

DESCRIPTION OF THE DRAWING

The preferred embodiment of the invention is described in more detail below with reference to the attached drawing in which.

DESCRIPTION OF THE PREFERRED EMBODIMENT

Figure 1:
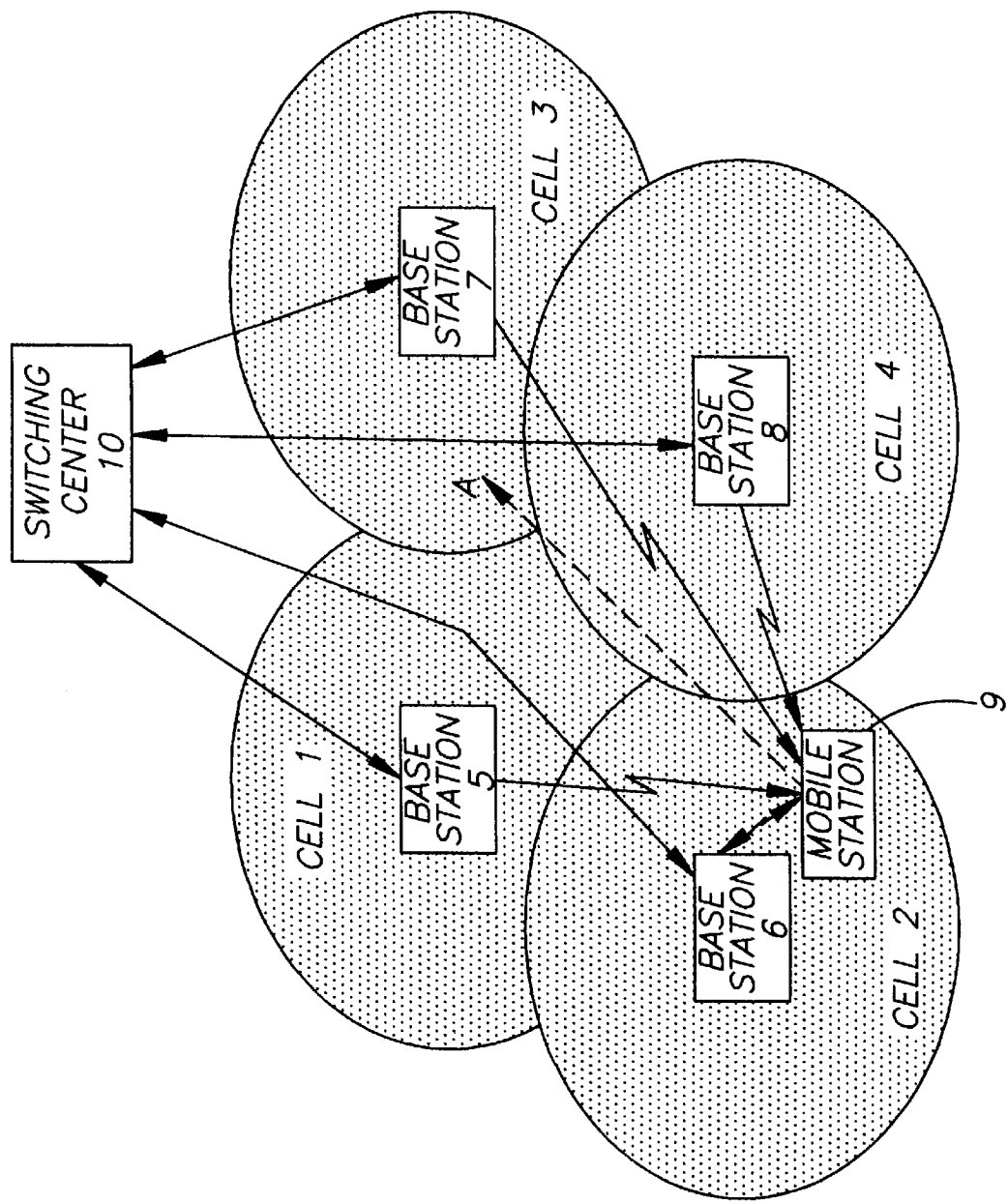
FIG. 1 is a schematic diagram of a cellular system.

A cellular system, as shown in FIG. 1, is designed to accomplish communications between geographically adjacent cells 1–4. Base stations 5–8 are constructed in each of the cells 1–4 to transmit and receive signals from a mobile station 9 as it travels through a cell. The operational range of each of base stations 5–8 overlap, but are concentrated in the corresponding cell. Each of base stations 5–8 communicate with a mobile switching center 10 which provides further communication with the public phone system.

Mobile station 9 is connected by two-way radio wave communication to the base station having the highest strength signal, for example, base station 6. During a communication, it is necessary to transfer from one base station to another as the mobile station travels across multiple cells as shown by path A in FIG. 1. The mobile switching center 10 transfers the communication currently connected, for example, through base station 6 to base station 7 in a process called handoff. Handoff is based on the analysis of received signal strength indicators (RSSI) generated by the mobile station 9 based on signals received from the various elements of the system in the vicinity of mobile station 9. The RSSI are compared and allow the switching center to select the strongest base station signal for potential handoff. In a system using mobile assisted handoff, as in the subject invention, the mobile station receives and analyzes signals from surrounding base stations and generates an RSSI which is transmitted to its current base station. In the mobile station of this invention the RSSI of the current base station 6, as shown in FIG. 1, is continuously transmitted to the base station 6 as an absolute value. Signal indications from base stations 5, 7, and 8 are received at mobile station 9 where the demodulator 21 calculates a signal indicative of the strength of the signal received from each of the other base stations. The calculated RSSI of each of the other base stations are compared to the current traffic channel RSSI (base station 6) in the digital signal processor 12. A resultant signal is calculated relative to the difference between the current channel RSSI and the other base station RSSI. This differential signal is then transmitted to the current base station 6 and on to the switching center 10. Handoff to the next base station is initiated either by the current base station or the switching center 10 based on a predetermined event such as the current base station absolute signal value diminishing to a threshold level or the differential signal increasing to a level indicating that a handoff is warranted. The next base station traffic channel is selected based on the strongest signal level. This process is normally accomplished at the switching center 10.

Figure 2:
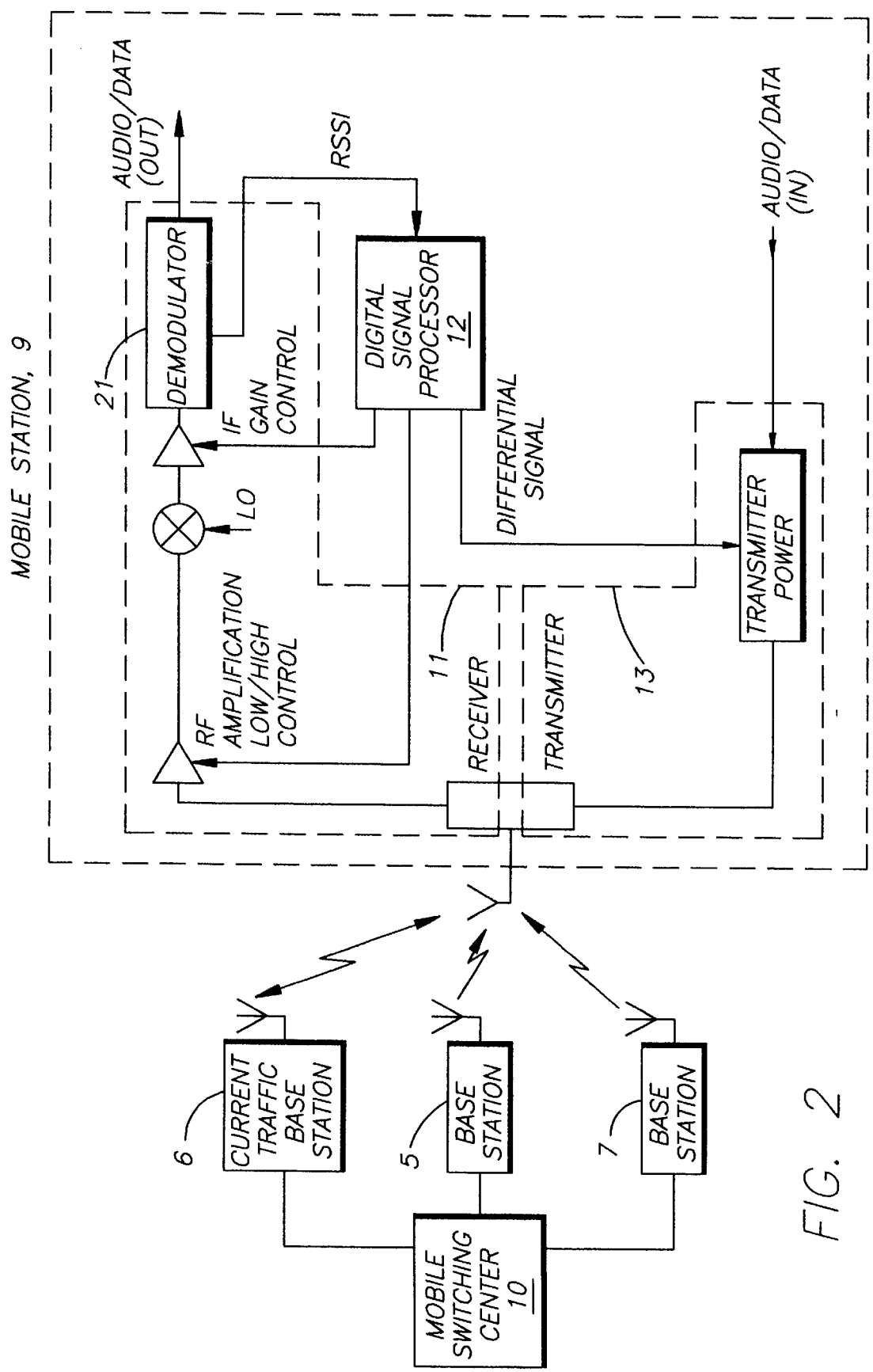
FIG. 2 is a schematic diagram of the cellular system including the mobile station of this invention.

As shown in FIG. 2, mobile station 9 is designed with a receiver 11, digital signal processor 12, demodulator 21 and transmitter 13 in association with appropriate amplification and power stages as shown. Signals received from each of the surrounding base stations, are processed and a value (RSSI) which is indicative of the signal strength from a particular base station is calculated. These values are compared to the current base station signal. A differential signal is generated by the digital signal processor 12 having a value proportional to the difference between the current base station RSSI and that of another nearby base station. For example if a current signal strength is at a level of −45 dBm and a potential handoff base station has signal strength level of −41 dBm, then a signal indicative of +4 dBm is transmitted to the mobile switching center through the current base station. The handoff decision can be evaluated directly based on the signal from the mobile station without further calculation by the base station, thereby freeing base station computing capacity for other uses. The analysis criterion and process is described in detail in the IS-136 standard for dual mode cellular systems.

Figure 3:
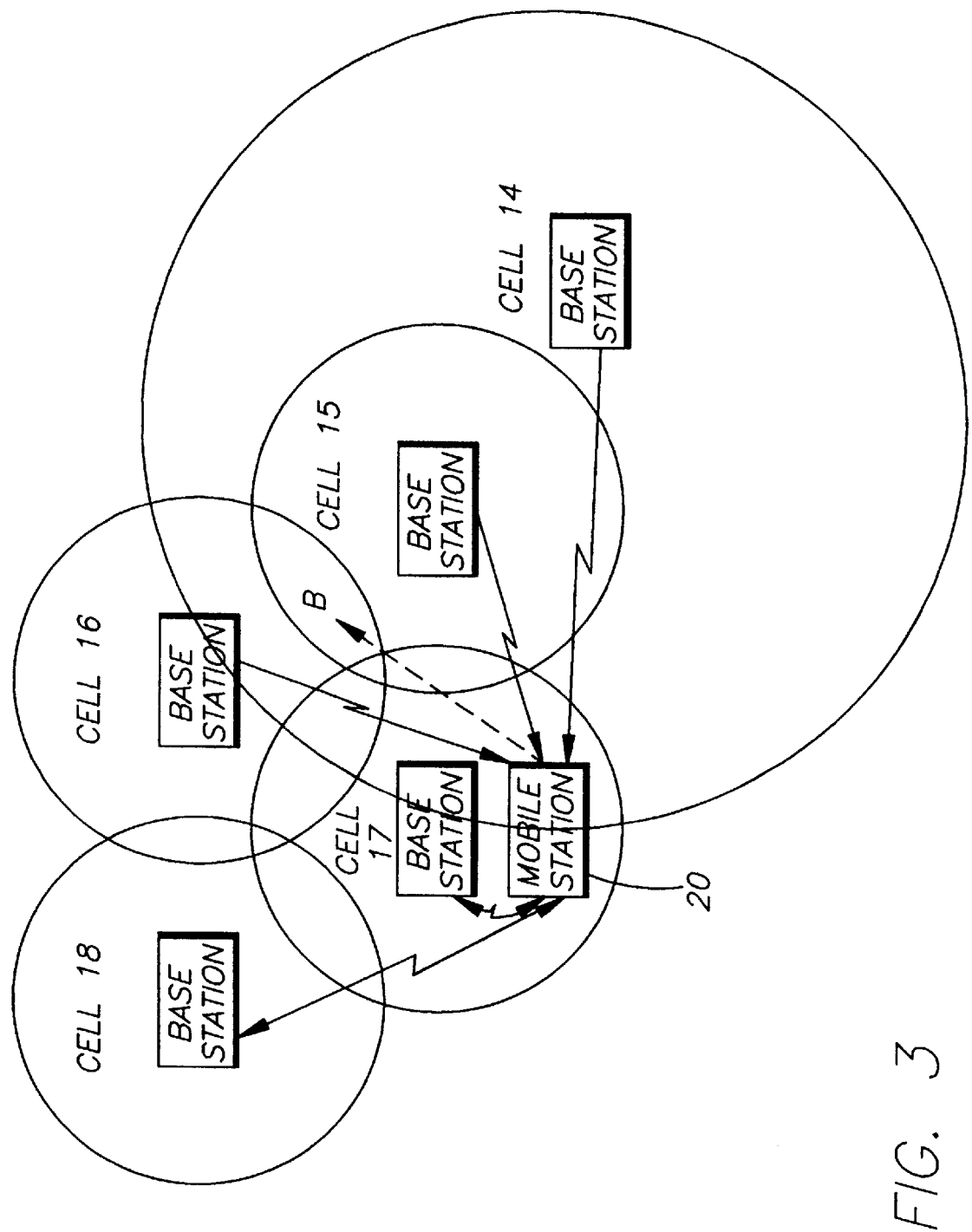
FIG. 3 is a schematic diagram of a cellular system having macro and micro cells.

As shown in FIG. 3, a cellular system may consist of a macro cell 14 and micro cells 15 through 18 which completely overlap. The base station 19 of the macro cell will use relatively high power levels while the power level of the micro cells are significantly lower. When mobile station 20 is traversing a macro cell, it may also be traveling through micro cell 15, 16, and 17 as shown by path B in FIG. 3. In this instance it would be beneficial to be transmitting through the micro cells in order to operate at lower power consumption levels. Using the lower power level will also result in lower interference. This may warrant that the handoff be accomplished on the basis of differential criterion based on the difference of the power levels of the system.

Operation under the confines of the IS-136 standard means that the RSSI is reported by 5 bits and with a resolution of 2 dB which results in 32 levels or 64 dB dynamics. The range of the RSSI received must be between −51 dBm and −113 dBm. Under this specification, base station signals of −35 dBm and −49 dBm would both be indicated as −51 dBm and no selection between these cells can be made. This would result in the failure to recognize the micro cell over the macro cell. By generating differential signals, this problem is reduced and macro and micro cells can be identified.

The method of this invention, allows the automatic gain control to operate in its most linear range and increases the accuracy of the higher level base station signals which are the most probable to be involved in a handoff. This minimizes the need for fine tuning of the gain control during production, thereby reducing the cost of the system.

In this manner a simplified signal is transmitted which is compatible with the performance characteristics of existing components, while accuracy and therefore the effectiveness of the handoff procedure is enhanced. The number of potential handoff candidates can be reduced as only those having a relative signal level of 20–25 db above or below the current signal level need be considered, thereby making the handoff operation more reliable.

We claim:

1. A method of handing off signals between cells of a cellular system, in which the system comprises at least one mobile station, a plurality of base stations serving the cells and a switching center, said base stations including a current base station and surrounding base stations; said mobile station communicating by radio through the base station to the switching center, said switching center connecting the cellular system to a local phone system; said handoff method determining the optimum base station to receive the communication transferred from the current base station comprising:

transmitting a signal from a number of the base stations;

receiving the base station signals of surrounding base stations at the mobile station, generating a signal having a value indicative of the strength of the received signals comparing the value of said signals to the value of the current base station signal, and generating evaluation signals relative to the difference therein;

transmitting a signal indicative of the absolute value of the strength of the current system signal and the evaluation signals to the current base station;

initiating a transfer to the base station having the strongest signal according to said evaluation signals.

2. A method of handing off signals between cells of a cellular system as described in claim 1, wherein the transfer is initiated when the value of an evaluation signal reaches a predetermined level.

3. A method of handing off signals between cells of a cellular system as described in claim 1 wherein the transfer is initiated when the current base station signal strength value weakens to a predetermined level.

4. In a system for handing off signals between cells of a cellular system, in which the cellular system comprises at least one mobile station, a plurality of base stations serving the cells, including a current base station and adjacent base stations; said mobile station communicating by radio to the base station; a sub-system for determining the optimum base station to receive the communication transferred from the current base station comprising:

means to transmit a signal from a number of the base stations;

means to receive the base station signals of surrounding base stations at the mobile station, to generate a signal to compare the value of said signals to the value of the current base station signal, and to generate an evaluation signal relative to the difference therein;

means to transmit from the mobile station, a signal indicative of the absolute values of the strength of the current base station and the evaluation signals of surrounding base stations to the current base station;

means to initiate a transfer to the adjacent base station having the strongest signal according to the evaluation signals.

5. In a system for handing off signals between cells of a cellular system, in which the cellular system comprises at least one mobile station, a plurality of base stations serving the cells, including a current base station and adjacent base stations; said mobile station communicating by radio to the base station; a sub-system for determining the optimum base station to receive the communication transferred from the current base station as described in claim 4 wherein the transfer is initiated when the current base station signal strength value weakens to a predetermined level.

6. In a system for handing off signals between cells of a cellular system, in which the cellular system comprises at least one mobile station, a plurality of base stations serving the cells, including a current base station and adjacent base stations; said mobile station communicating by radio to the base station; a sub-system for determining the optimum base station to receive the communication transferred from the current base station as described in claim 4 wherein the transfer is initiated when the value of an evaluation signal reaches a predetermined level.

7. A method for handing off connections between channels of a cellular radio communications system comprising plurality of base stations each having at least one two way radio channel, at least one mobile station capable of being in two way radio communication with a current base station and a switching center connected to each of the base stations and providing a connection between the base stations and a land line communications network, the method comprising:

transmitting a signal from a number of the said base stations;

monitoring the signals transmitted from the other base stations at the mobile station;

generating a value indicating the power levels of the signals received by the mobile station;

comparing said value of other base stations to the value of the current base stations, and generating difference information of the signal power levels;

transmitting said difference information to the switching center through the current base station, and handing off the communication between the mobile station and the current base station to another channel according to the difference information.

8. A method according to claim 7 wherein said other channel is served by another base station.

9. A method according to claim 7 wherein said value indicating the power levels is the Received Signal Strength Indicator.

10. A method according to claim 7 wherein said comparing and said difference information generation are accomplished by Digital Signal Processing.

11. A cellular radio communications system comprising a plurality of base stations each having at least one two way radio channel and a number of the base stations transmitting a signal, at least one mobile station capable of being in two way radio communication with a current base stations and a switching center connected to each of the base station and providing a connection between the base stations and a land line communications network, the mobile station comprising:

means for monitoring signals transmitted from the other base stations;

means for generating a value indicative of the power levels of the signals received by the mobile station;

means for comparing said value of the other base stations to the value of the current base station, and generating difference information of the signal power levels;

means for sending said difference information to the switching center through the current base station for channel hand off accomplished by the switching center.

12. A cellular radio communications system according to claim 11, wherein said other channel is served by another base station.

13. A cellular radio communications system according to claim 11, wherein said value describing the power levels is the Received Signal Strength Indicator.

14. A cellular radio communications system according to claim 11 wherein said comparing and said difference information generation are accomplished by Digital Signal Processing means of said mobile station.

\* \* \* \* \*